United States Patent
Goldsby

[15] 3,691,252
[45] Sept. 12, 1972

[54] REDUCTION OF HYDROCARBON CONTENT OF SPENT ACID FROM SULFURIC ACID RECOVERY

[72] Inventor: Arthur R. Goldsby, Chappaqua, N.Y. 10017

[73] Assignee: Texaco Development Corporation, New York, N.Y.

[22] Filed: June 15, 1970

[21] Appl. No.: 48,893

Related U.S. Application Data

[63] Continuation of Ser. No. 740,586, June 27, 1968, abandoned, Pat. No. 3,462,512.

[52] U.S. Cl..............................260/683.62, 23/172
[51] Int. Cl.......C07c 3/54, C01b 17/88, C01b 17/90
[58] Field of Search.......260/683.62, 683.61, 683.59; 23/172

[56] References Cited

UNITED STATES PATENTS

| | | |
|---|---|---|
| 3,462,512 | 8/1969 | Goldsby................260/683.62 |
| 3,234,301 | 2/1966 | Goldsby................260/683.62 |
| 2,511,810 | 6/1950 | Arnold..................260/683.61 |

Primary Examiner—Delbert E. Gantz
Assistant Examiner—G. J. Crasanakis
Attorney—K. E. Kavanagh, Thomas H. Whaley and H. L. Madinger

[57] ABSTRACT

Method for reducing hydrocarbon content of spent sulfuric acid obtained by absorbing olefin in used sulfuric acid catalyst, reacting with olefins to form dialkyl sulfates and extracting dialkyl sulfates with isobutane; the resulting spent sulfuric acid is diluted with water to free polymeric oil and to hydrolyze alkyl sulfates to alcohols; and the polymeric oil and alcohols are removed, leaving a dilute acid of reduced hydrocarbon content.

7 Claims, 1 Drawing Figure

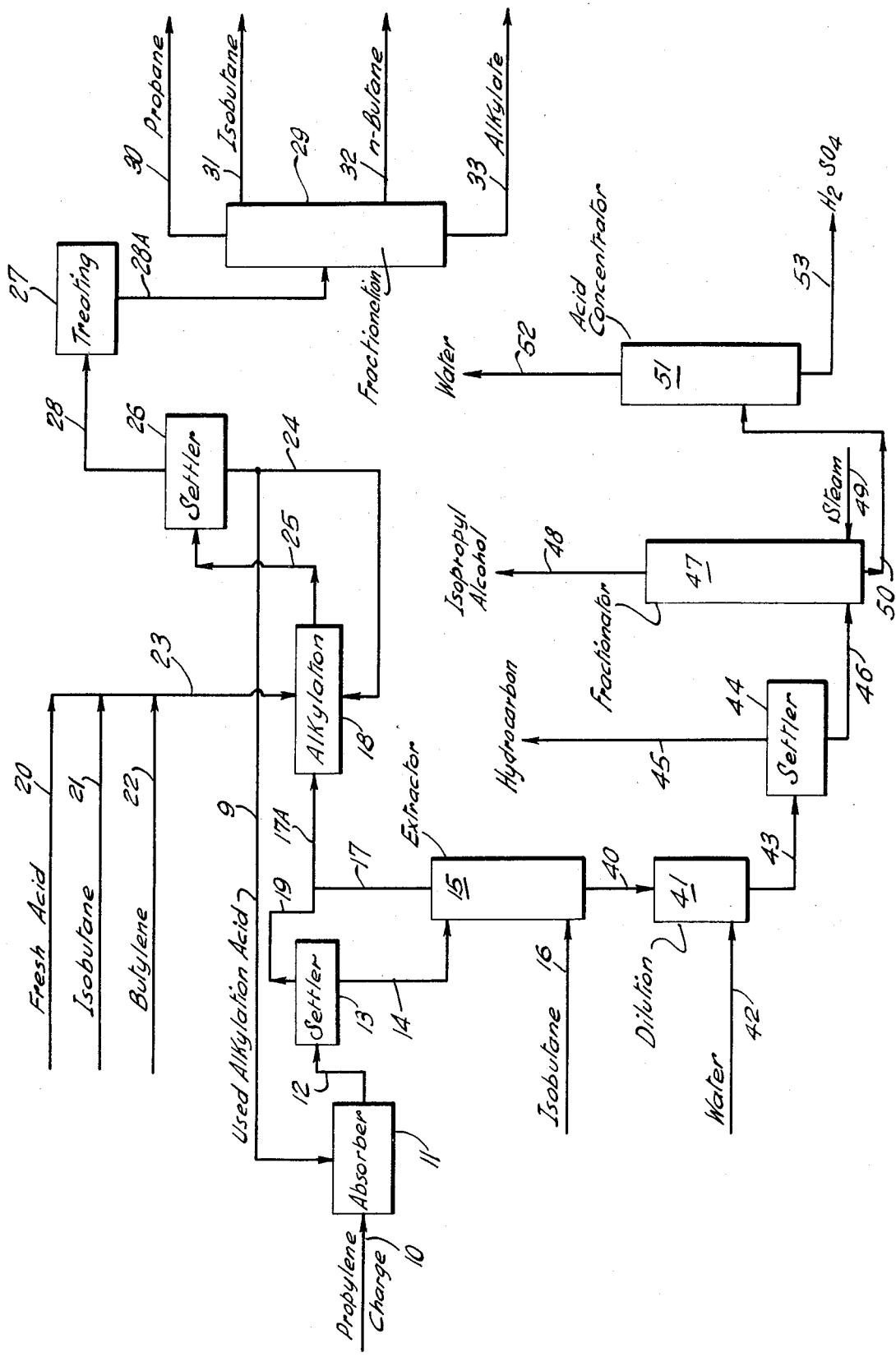

3,691,252

REDUCTION OF HYDROCARBON CONTENT OF SPENT ACID FROM SULFURIC ACID RECOVERY

CROSS-REFERENCE TO RELATED APPLICATIONS

This application is a continuation of copending application Ser. No. 740,586, filed June 27, 1968 and now abandoned.

This invention is related to a process disclosed in my U.S. Pat. No. 3,227,774 issued Jan. 4, 1966, which describes formation and removal of alcohol from spent alkylation acid and to my copending application, Ser. No. 704,933, filed Feb. 12, 1968, now U.S. Pat. No. 3,462,512, which discloses the complete removal of dialkyl sulfate from the olefin absorber reaction product.

BACKGROUND OF THE INVENTION

Field of the Invention

This invention is directed to improvements in the utilization of sulfuric acid used in the alkylation of olefins or aromatics in the presence of sulfuric acid catalyst. More particularly, it is directed to a method of restoring the catalytic effectiveness of sulfuric acid catalyst by the absorption of olefins therein, extracting the resulting dialkyl sulfates from the alkylation contaminants with isobutane, and alkylating the extracted dialkyl sulfates with release of 100 percent $H_2SO_4$. Only a small percentage of alkyl acid sulfate is removed by extraction with isobutane and the spent acid remaining after extraction of the dialkyl sulfates contains a high percentage of alkyl acid sulfate. Since the acid is usually sent to conventional acid recovery by burning, this represents a loss of valuable olefins. Such acid may contain as much as about 35 percent hydrocarbon. In addition to the olefin in the acid in the form of alkyl sulfates, the acid also contains the polymeric hydrocarbon oil from the sulfuric acid alkylation catalyst, as well as any polymeric oil formed during the absorption step. Such an acid is not as desirable as one with a lower hydrocarbon content, for example, about 5–10 percent, as a charge stock for conventional acid recovery processes based on burning the acid to produce $SO_2$ which is then oxidized to $SO_3$ and ultimately produces $H_2SO_4$. In other words, spent acid would be improved for charging to conventional recovery processes by reducing its hydrocarbon content.

SUMMARY OF THE INVENTION

In accordance with my invention, olefin remaining in spent sulfuric acid from alkylation after reaction with olefin followed by removal of the dialkyl sulfates, and which is present principally as olefin in alkyl acid sulfate, is recovered from the spent acid by converting the alkyl sulfates to alcohol and recovering the alcohol from the acid. In the process, the polymeric oil also is separated from the spent acid by dilution of the acid with sufficient water both to hydrolyze the alkyl sulfates to alcohols and to cause separation of the polymeric oil. The alcohols are recovered by distillation and the polymeric oil is removed either before or after the alcohol removal by gravity or accelerated settling.

BRIEF DESCRIPTION OF THE DRAWINGS

Having set forth its general nature, the invention will be best understood from the more detailed description hereinafter which refers to the accompanying drawing. Although the drawing illustrates one arrangement of apparatus in which the process of this invention may be practiced, it is not intended to limit the invention to the particular apparatus or materials described. The invention may be applied to commercial alkylation processes operated in combination with the sulfuric acid recovery process described herein, and for the production of various alcohols.

DESCRIPTION OF PREFERRED EMBODIMENTS

A liquid propylene stream which may contain propane but which is substantially free of ethylene and butylenes is passed through line 10 to absorber 11 operated under liquid phase conditions at about 30°–40 °F. and 75 psig. Used sulfuric acid alkylation catalyst having a titratable acidity of 90 percent $H_2SO_4$ is also passed to absorber 11 from alkylation settler 26 through line 9. The absorber reaction mixture from absorber 11 is passed through line 12 into settler 13. The acidic phase from settler 13 comprising isopropyl acid sulfate, diisopropyl sulfate and polymeric oil alkylation contaminant is passed through line 14 to countercurrent extractor 15 where the diisopropyl sulfate is removed by extraction with isobutane charged to extractor 15 through line 16.

The extract solution of diisopropyl sulfate in isobutane from extractor 15 is passed through lines 17 and 17A to alkylation reactor 18. Unreacted propylene and propane containing dissolved diisopropyl sulfate from settler 13 is passed through lines 19 and 17A to alkylation reactor 18. Fresh sulfuric acid of 99.0 to 99.5 percent concentration charged through lines 20 and 23, isobutane charged through lines 21 and 23, butylenes charged through lines 22 and 23, and recycle alkylation acid of about 90 percent titratable acidity charged through line 24 are passed to alkylation reactor 18. The reaction mixture from alkylation reactor 18 is passed through line 25 to settler 26. The alkylate or hydrocarbon phase from settler 26 is passed to conventional treating facility 27 through line 28 for removal of acidic material. The treated alkylate is passed through line 28A to fractionation facility 29 from which propane through line 30, isobutane through line 31, n-butane through line 32 and alkylate through line 33 are removed.

The acid phase from extractor 15 is passed through line 40 to dilution tank 41 to which water is added through line 42 and mixed thoroughly with the acid phase. The diluted and well mixed material is passed through line 43 to settler 44. An upper hydrocarbon phase comprising polymeric hydrocarbon and diisopropyl sulfate is taken off through line 45. Although not shown on the figure, the diisopropyl sulfate can be separated from the polymeric hydrocarbon and either passed to alkylation reactor 18 or fractionator 47. The acidic phase from settler 44 is passed through line 46 to fractionator 47 where isopropyl alcohol is removed through line 48. Steam is passed to fractionator 47 through line 49 to assist in the hydrolysis of the propyl sulfates and in the removal if isopropyl alcohol.

Dilute acid of about 50 percent acidity is removed from fractionator 47 through line 50 and passed to acid concentrator 51. Water is removed through line 52 and concentrated acid is removed through line 53. Concentrated acid from line 53 is sent to conventional acid recovery such as by burning to sulfur dioxide followed by oxidation of the sulfur dioxide to sulfur trioxide, or for uses for which such acid is satisfactory.

OLEFIN ABSORBER

Various olefins, such as propylene, butylenes and amylenes, and mixtures thereof can be used for reaction with used alkylation acid in the olefin absorber. Secondary olefins such as propylene and n-butylenes are preferred. Unless it is desired to make ethyl alcohol also, the olefin feed stock should be substantially free of ethylene.

It should be emphasized that it is desired to convert as much as possible, preferably at least 80 to 90 percent, of the used sulfuric acid catalyst in the absorption step to dialkyl sulfate. This may be accomplished by using good absorption conditions, including efficient mixing, countercurrent flow, and an excess of olefin in relation to the acid, that is, in excess of 2 mols of olefin per mol of acid.

The olefin absorption may be carried out in either vapor or liquid phase, or in a combination of the two. For example, part of the absorption may be carried out in the vapor phase, followed by liquid phase for the final portion of the absorption step for a high conversion of the acid to dialkyl sulfates. Cooling in the absorption step may be effected, if desired, by introducing all or a part of the charge, or extraneous hydrocarbons, such as propane, in liquid phase and allowing it to vaporize by the heat of reaction in the absorber. Cooling may also be effected by using charge streams to the absorber cooled to a temperature below the absorber reaction temperature, for example, the used acid catalyst may be supplied from an emulsion flashing alkylation operation. Cooling may also be obtained by indirect heat exchange with cooling coils either in the absorber or outside.

Used alkylation acid catalyst having a titratable acidity of from 88 to 93 percent by weight and containing only about 2 to 4 percent water is the preferred acid charge stock for the absorption step, although in some cases, for example, if amylenes are being alkylated, it may have a concentration as low as 80 to 85 percent. Acid from other sources, such as fresh acid, acid from chemical reactions, and acid from the acid treatment of petroleum naphtha or lube oil also may be used.

A short residence time and low temperature are conducive to good results in the absorber and preferred although other factors have a considerable bearing on these variables. The efficiency of contacting of olefin with acid is of course very important. Residence times as short as a few seconds or minutes may be used, if a feed stock is passed through an efficient contacting device. On the other hand, a residence time as long as an hour or longer may be used in a liquid phase reactor, or in a packed countercurrent tower by venting inerts in vapor phase and recycling liquid reaction mixture from near the bottom of the tower to about half way up or higher in the tower.

A temperature range of 30° to 50° F. is satisfactory for propylene absorption although less conjunct polymer is formed at lower temperatures. For n-butylene containing stocks, a temperature of 20° to 40°F. is preferred.

The absorption step can be effected by contacting equipment well known in the art, for example, mixer settlers, centrifugal contactors, countercurrent towers or two or more mechanically stirred reactors operating to give countercurrent flow. Multi-stage countercurrent contacting is preferred.

Although not a great deal of inerts remains dissolved in the liquid product from the absorber, if desired the inerts may be removed, for example, by reducing the pressure on the liquid product and venting the evolved gases.

EXTRACTION OF THE OLEFIN ABSORBER REACTION PRODUCT

Although various methods can be used to separate dialkyl sulfate from the olefin absorber reaction product, I prefer to extract it with a hydrocarbon solvent. Various aromatic and aliphatic hydrocarbons can be used, but I prefer an aliphatic hydrocarbon, such as propylene, propane, butylenes, butanes, and alkylate, and in particular isobutane.

Even though very good extraction conditions are used for this extraction step, it has not been found possible to remove all of the alkyl sulfates. In fact, the spent acid from this extraction step is predominantly alkyl sulfates, and in particular alkyl acid sulfates, with some free sulfuric acid also present. In some cases, even in commercial operation when the conditions are not optimum in the extraction step, there may be as much as 25–30 percent by weight of diisopropyl sulfate left in the spent acid after extraction. A typical analysis of a spent acid when propylene is absorbed in used alkylation acid catalyst comprises 2.5 percent water, 11.4 percent acid-polymeric oil comples, 11.4 percent diisopropyl sulfate, 64.0 percent propyl acid sulfate, and 10.7 percent free sulfuric acid. Diisopropyl sulfate is equivalent to or contains 46.2 percent of propylene and propyl acid sulfate is equivalent to or contains 30 percent of propylene. On occasion some free sulfuric acid may be present with a corresponding reduction in propyl acid sulfate.

If one attempts to release the olefin directly from the alkyl sulfates in the spent acid, for example, by raising the temperature, say above about 100°F., polymerization and adverse side reactions occur with the result that much of the olefin is not removed and is converted to materials not suitable for alkylation. Also, as the temperature is raised, decomposition of the acid results.

It is the spent acid from this extraction step containing a substantial amount of chemically combined olefin in the form of alkyl sulfates and polymeric oil which I treat to remove the olefin and polymeric oil and thereby reduce the hydrocarbon content of the acid.

Low temperatures and short times are preferred for the hydrocarbon extraction of the olefin absorber reaction product. For example, a temperature range of 30° to 50°F. with a few minutes residence time is satisfactory. However, good results have been obtained at ambient temperatures as high as 85° to 100°F. The conditions depend somewhat upon the absorption product and the olefin used for the absorption step.

The extraction step may be effected in equipment known in the art, for example, mixer-settlers, centrifugal cont or countercurrent towers, for example, a rotating disc contactor. Less efficient extraction may be used to accomplish the same results if more water is present in the absorber reaction product as will be disclosed in more detail later.

Dialkyl sulfates are more readily extracted than the alkyl acid sulfates with a hydrocarbon solvent. It is desirable to use conditions in the extraction step so as to extract as much as possible of the dialkyl sulfate and to approach as nearly as possible only acid-oil reaction product and water in the raffinate spent acid phase, with all of the alkyl sulfates going into the extract or organic phase. Such conditions include the use of efficient mixing, a liquid solvent dosage of the order of 6 moles per mole of alkyl sulfate, or higher, raffinate recycle, multi-stage countercurrent extraction, and optimum charge rate for a given extraction vessel. The raffinate or spent acid from the extraction step comprises water, alkyl acid sulfate, dialkyl sulfate and the reaction product of acid and polymeric oil formed during the alkylation and absorption steps. The extract comprises the hydrocarbon solvent, dialkyl sulfate, and a minor amount of alkyl acid sulfate.

The weaker the raffinate acid is in the extraction step, the higher the relative solubility of the polymer oil is in hydrocarbon solvent, or the polymer oil is held less tightly by the acid. Polymeric oil contaminant in the absorber-extractor extract is highly unsaturated and it reacts readily with strong sulfuric acid, such as fresh make-up acid used for the alkylation step, or used alkylation acid catalyst, of about 90 percent concentration. The polymeric oil then may be removed from the absorber extract by acid treatment prior to charging it to alkylation, and optionally after removal of any excess unreacted olefin. Good results have been obtained by acid treating polymeric oil in isobutane solution with used alkylation acid of about 90 percent concentration at a temperature of 85°F. and a time as long as one hour in an amount about equal in weight to that of the free oil. However, a temperature not over about 40° to 60°F. and a short time on the order of a few minutes or less are preferred. A very short time such as is obtained by mixing with a pressure drop orifice appears to be satisfactory. To insure substantially complete removal of the oil and also any water present, an excess of acid may be used. If too great an excess of acid is used, some dialkyl sulfate will dissolve in it and be lost from the extract. This is not too serious as the dialkyl sulfate may be reextracted with a hydrocarbon solvent from the separated acid phase. Or when operating in a continuous system, the acid phase may be charged to the main extraction tower. Alternatively to acid treating the extract, the entire absorber reaction product prior to extraction of the dialkyl sulfates may be acid treated to remove the polymeric oil.

DIALKYL SULFATE EXTRACTION WITH WATER DILUTION

In continuous operation even with efficient countercurrent extraction with isobutane it has been found that approximately 5–10 percent by weight of dialkyl sulfate based on the spent acid may remain in the spent acid. In other words, an appreciable amount of dialkyl sulfate is not extracted when no water is added to the absorption mixture. In some cases when optimum conditions are not used, there may be as much as 25–30 percent by weight of diisopropyl sulfate remaining in the spent acid.

If the dialkyl sulfate is present in the spent acid when the alkyl sulfates are hydrolyzed to alcohols, it also will be converted to alcohol. In order to return the maximum amount of acid to the alkylation system, it is advantageous to remove substantially all of the dialkyl sulfate before hydrolyzing the alkyl sulfates.

I have found that when water is added to the spent acid or absorber reaction product to cut the equivalent acidity, it unexpectedly makes the dialkyl sulfate less soluble and much easier to extract. From the standpoint of acid recovery, it is advantageous to extract substantially all of the dialkyl sulfate from the spent acid prior to converting the alkyl acid sulfates and residual dialkyl sulfates to alcohols. This has the advantage of recovering acid in the form of dialkyl sulfates as well as recovering olefin from the spent acid. For this purpose the extraction with hydrocarbon solvent is best carried out in the liquid phase. I prefer to employ isobutane as the hydrocarbon solvent. For this particular alternative of removing substantially all of the dialkyl sulfate by extraction prior to converting the alkyl acid sulfate to alcohols, or adding at least part of the water and then extracting dialkyl sulfate prior to hydrolyzing the alkyl acid sulfate, it has been found adequate to add just enough water to the spent acid after the bulk of the dialkyl sulfate has been extracted, or to the absorber reaction product, to give a final equivalent acidity of about 85–90 percent. Further dilution of the spent acid makes it even easier to extract the dialkyl sulfate, but this is not necessary. The minimum amount of water necessary to give the desired results should be used since the system becomes more corrosive and there is a greater tendency to extract polymeric oil as more water is added.

I have found in laboratory work that when 5.7 percent by weight of water is added to an absorber reaction mixture of propylene and sulfuric acid from which unreacted propylene has been removed, that as much diisopropyl sulfate can be extracted in a single batch extraction with isopentane as with four batch extractions with isopentane when water is not added. In each case essentially all of the diisopropyl sulfate was extracted. The addition of about 4 to 7 percent by weight of water is generally preferred. Thus, essentially all of the dialkyl sulfate can be extracted with isobutane directly from the absorber reaction mixture, or from the spent acid after 80 percent or more of the dialkyl sulfate has been extracted, by diluting either the absorber reaction mixture or the spent acid with enough water to give a final equivalent acidity of about 85–90 percent.

WATER DILUTION AND HYDROLYSIS

Water is added to the spent acid to hydrolyze the alkyl sulfates to alcohols. This water can be added to the spent acid after the extraction of the dialkyl sulfate, as discussed in the preceding section, or it can be added to the spent acid containing an appreciable amount of dialkyl sulfate. Although heat of dilution causes the solution to rise in temperature, additional heat such as by addition of steam may be supplied to distill the alcohols from the mixture. The alcohols are purified by conventional means if desired. Enough water or steam should be added in this dilution step to maintain the acidity below about 50 percent weight percent $H_2SO_4$. The final acidity after removal of the alcohols is about 50 percent. The dilute acid of about 50 percent concentration is concentrated to about 88 percent by removing water, and is then sent to conventional recovery for conversion to fresh 99.0–99.5% $H_2SO_4$.

When as much as an equal volume of water is added to the spent acid so that the equivalent acidity is reduced to about 50% $H_2SO_4$ or less, the polymeric oil, which in the spent acid is tied up as acid-oil complex, is freed from the complex and is insoluble in the mixture. The oil may be removed by gravity separation or by means of a centrifuge either before or after removal of the alcohols. As indicated hereinbefore, if it is desired to remove this oil prior to removal of alcohols, it is advantageous first to remove substantially all of the dialkyl sulfate prior to water dilution to 50 percent or less acidity. This may be accomplished by adding a small amount of water, preferably only about 5–10 percent by weight, to the spent acid and extracting the dialkyl sulfates from the mixture with isobutane. This amount of water is sufficient to aid in extraction of the dialkyl sulfate but not enough to free the oil from the complex. The isobutanedialkyl sulfate is not removed prior to water dilution to 50 percent or less, dialkyl sulfate will separate with the oil. The oil must then be separated from the dialkyl sulfate before the dialkyl sulfate can be charged to alkylation. As an alternative, the oil and dialkyl sulfate can be left in the spent acid for the hydrolysis and alcohol removal step. In this case, the dialkyl sulfate is also converted to alcohol, and the oil can be removed by gravity or accelerated settling after the alcohol is removed.

EXAMPLE

A sample of spent acid of the type obtained after extraction in extractor 15 when charging propylene to absorber 11 has the following composition:

|  |  | Weight Percent |
| --- | --- | --- |
| Water |  | 2.5 |
| Acid-polymeric oil complex |  | 11.4 |
| Isopropyl acid sulfate |  | 64.0 |
| Diisopropyl sulfate |  | 11.4 |
| Free sulfuric acid |  | 10.7 |
|  | Total | 100.0 |

The above analysis corresponds to a 30.2 percent hydrocarbon content made up of 5.7 percent of polymeric oil and 24.5 percent of propylene.

Water in the amount of 6 percent by weight or 6.0 pounds per 100 pounds of spent acid is added to the spent acid and the diluted mixture extracted with four volumes of isobutane for the removal of the diisopropyl sulfate. The residual mixture after extraction has the following composition:

|  |  | Weight Percent |
| --- | --- | --- |
| Water |  | 9.0 |
| Acid-polymeric oil complex |  | 12.0 |
| Isopropyl acid sulfate |  | 67.7 |
| Free Sulfuric Acid |  | 11.3 |
|  | Total | 100.0 |

Two volumes of water are added to the above mixture causing release of the polymeric oil from the acid complex. The released oil is separated and recovered. The heat of dilution and additional heat supplied by steam provide the heat required for hydrolysis of the isopropyl acid sulfate to isopropyl alcohol which is distilled from the mixture and purified. The yield of purified isopropyl alcohol is about 65 percent based on the propylene reacted in the absorber.

When alcohols such as ethyl, propyl and butyl, are made from spent sulfuric acid containing polymeric oil, such as from alkylation or the processes described herein, some of the oil or impurity may be carried over with the alcohol during the distillation step. This gives the alcohol a disagreeable odor and a yellow color. It has been found that the impurity can be removed, resulting in a colorless product of improved odor, by distilling the alcohol over caustic. Distilling over 1–2 percent of solid caustic has given good results.

The resulting weak acid of about 50 percent concentration is concentrated to about 85–88 percent by removing water. The 85–88 percent acid can be used directly for chemical uses, such as isopropyl alcohol manufacture, or it can be sent to a conventional acid recovery system for sulfuric acid manufacture by burning to sulfur dioxide, oxidation of the $SO_2$ to sulfuric trioxide followed by absorption of the $SO_3$ in sulfuric acid to form 99.0–99.5 percent acid, which is suitable for alkylation.

The acid after alcohol and polymeric oil removal, followed by concentration to about 85–88 percent has a greatly reduced hydrocarbon content in the range of only about 2 to 8.5 percent by weight in contrast to the 30.2 percent in the spent acid after absorption and extraction.

ALKYLATION

In general the conditions for conducting the alkylation reaction are those which are well known in the art. However, the bulk of the make-up acid is charged to the alkylation reactor as dialkyl sulfates obtained from the recovery section of the process, and only a minor portion of the acid charge is fresh make-up acid of the usual 98.0 to 99.5 percent concentration. Since the dialkyl sulfates are substantially water-free, the trend is for the alkylation system catalyst, when using my acid recovery process, to be of lower water content and, in general, of superior quality in that a lower end point alkylate of higher octane value is obtained. Of course, if desired, less drying of charge stock can be used, and in such a case the water content of the system catalyst may be as high as in conventional operation without acid recovery. The sulfuric acid in the alkylation system is usually maintained within a range of about 88 to 95 percent by purging spent acid from the system. In a multiple reactor system, the acid of the lowest concentration is preferably purged and sent to the acid recovery system.

A large excess of isobutane is used in alkylation, for example, as much as 60 to 80 volume precent of the hydrocarbons in the alkylation reaction mixture. Consequently, a large quantity of isobutane must be recovered and recycled for reuse in the alkylation process. This isobutane is also available for use in the extraction section of the recovery process as described.

In addition to the olefin which is charged to the alkylation step in the form of dialkyl sulfates, additional fresh olefin is usually charged to the alkylation step. For example, when propylene is used for the absorption step, it is advantageous to use butylenes in the alkylation step.

Obviously, many modifications and variations of the invention as hereinabove set forth, may be made without departing from the spirit and scope thereof, and therefore, only such limitations should be imposed as are indicated by the appended claims.

I claim:

1. In a process for the recovery of used sulfuric acid alkylation catalyst from an alkylation process wherein an isoparaffin is reacted with an olefin in the presence of a sulfuric acid catalyst, and wherein used sulfuric acid alkylation catalyst contaminated with polymeric hydrocarbon is contacted with a sufficient quantity of olefinic hydrocarbon to produce an absorption product comprising predominately dialkyl sulfate with lesser quantities of alkyl acid sulfate, acid-polymeric hydrocarbon complex and water, and wherein said absorption product is extracted with a hydrocarbon solvent in liquid phase producing an extract solution comprising a major amount of said dialkyl sulfate present in said absorption product and a raffinate spent acid comprising unextracted dialkyl sulfate, alkyl acid sulfate, acid-polymeric hydrocarbon complex and water, the improvement which comprises diluting said raffinate spent acid with water to about 85–90 percent acidity, extracting said dialkyl sulfate content of said diluted raffinate spent acid with a second portion of hydrocarbon solvent producing a second dialkyl sulfate extract solution and a second raffinate spent acid, further diluting said second raffinate spent acid with water to below about 50 percent $H_2SO_4$ by weight thereby hydrolyzing said alkyl acid sulfate to alcohol and releasing said polymeric hydrocarbon from said acid-polymeric hydrocarbon complex, removing said alcohol and said released polymeric hydrocarbon from said diluted second raffinate spent acid, said diluted second raffinate spent acid after removal of said alcohol and said polymeric hydrocarbon complex containing about 50 percent by weight sulfuric acid.

2. The process of claim 1 in which said diluted spent acid after removal of alcohol and polymeric hydrocarbon has an organic content of not over about 8.5 percent by weight.

3. The process of claim 1 in which sufficient water is removed by distillation from said diluted spent acid after removal of said alcohol and said polymeric hydrocarbon to concentrate said spent acid to at least 85 percent by weight sulfuric acid.

4. The process of claim 3 in which said acid concentrated to at least 85 percent by weight sulfuric acid has a hydrocarbon content not over about 8.5 percent by weight.

5. The process of claim 1 in which said hydrocarbon solvent is isobutane.

6. The process of claim 1 wherein said alcohol and said released polymeric hydrocarbon removed from said diluted second raffinate spent acid are separated from each other.

7. In a process for the recovery of used sulfuric acid alkylation catalyst from an alkylation process wherein an isoparaffin is reacted with an olefin in the presence of a sulfuric acid catalyst, and wherein used sulfuric acid alkylation catalyst contaminated with polymeric hydrocarbons is contacted with a sufficient quantity of olefinic hydrocarbon to produce an absorption product comprising predominately dialkyl sulfate with lesser quantities of alkyl acid sulfate, acid-polymeric hydrocarbon complex and water, the improvement comprising diluting said absorption product with water in an amount equal to about 4–7 percent by weight of the absorption product, extracting said diluted absorption product with a hydrocarbon solvent in liquid phase producing an extract solution comprising substantially all of said dialkyl sulfate present in said absorption product and a raffinate spent acid substantially free of dialkyl sulfate and comprising predominately alkyl acid sulfate, acid-polymeric hydrocarbon complex and water and having an equivalent acidity of about 85–90 percent by weight, diluting said raffinate spent acid with water to below about 50% $H_2SO_4$ by weight thereby hydrolyzing said alkyl acid sulfate to alcohol and releasing said polymeric hydrocarbon from said acid-polymeric hydrocarbon complex, removing said alcohol and said released polymeric hydrocarbon from said diluted second raffinate spent acid, said diluted second raffinate spent acid after removal of said alcohol and said polymeric hydrocarbon complex containing about 50 percent by weight sulfuric acid.

* * * * *